United States Patent

Bailey

[15] 3,647,069
[45] Mar. 7, 1972

[54] ENCLOSED FLOTATION APPARATUS AND PROCESS

[72] Inventor: Robert S. Bailey, 3712 Kingridge Drive, San Mateo, Calif. 94403

[22] Filed: May 11, 1970

[21] Appl. No.: 36,025

[52] U.S. Cl. .................................. 210/44, 55/52, 210/97, 210/221
[51] Int. Cl. .......................................................B03d 1/00
[58] Field of Search .................55/52, 196; 209/169; 210/44, 210/97, 221

[56] References Cited

UNITED STATES PATENTS

| | | | |
|---|---|---|---|
| 1,505,323 | 8/1924 | Eberenz | 209/169 X |
| 1,505,324 | 8/1924 | Eberenz | 209/169 X |
| 2,274,658 | 3/1942 | Booth | 210/44 |
| 2,759,607 | 8/1956 | Boyd et al. | 210/44 |
| 2,948,677 | 8/1960 | Austin et al. | 210/44 |
| 3,477,581 | 11/1969 | Stearns | 210/195 |
| 3,491,880 | 1/1970 | Reck | 209/169 X |

FOREIGN PATENTS OR APPLICATIONS

| | | | |
|---|---|---|---|
| 951,457 | 3/1964 | Great Britain | 55/52 |

*Primary Examiner*—Michael Rogers
*Attorney*—Robert R. Finch and Richard F. Bojanowski

[57] ABSTRACT

Combined deaeration and flotation apparatus which includes an enclosed tank adapted to contain a body of liquid with an overlying freeboard space. Means for introducing oxygen-free gas into the freeboard space and means for inducting and dispersing the gas into the liquid are also provided. By means of the above apparatus, oxygen is displaced from the liquid and solids are assisted to the liquid's surface for floating whereby both solids and oxygen are separated to produce a clarified liquid of reduced oxygen content Efficiency of operation can be improved by maintaining the gas in the freeboard spaced at a pressure slightly above atmospheric.

8 Claims, 3 Drawing Figures

PATENTED MAR 7 1972

3,647,069

INVENTOR.
Robert S. Bailey
BY Robert R. Finch
His Attorney

ENCLOSED FLOTATION APPARATUS AND PROCESS

BACKGROUND OF THE INVENTION

The present invention relates generally to flotation apparatus and more particularly to an improved method and apparatus for separating insolubles and oxygen from a liquid.

DESCRIPTION OF PRIOR ART

During the recovery of oil from underground oil deposits, it is not uncommon to surface relatively large amounts of oil-water mixtures. Before the oil can be refined the water must be separated or extracted therefrom. Disposal or reuse of this extracted water presents a formidable problem, particularly since the water is generally contaminated with petroleum and/or other insoluble contaminants such as silica particles. If the water is to be returned to the well, it is generally necessary to reduce the total suspended solids content to 10 p.p.m. or less. In many cases it is also desireable, and even necessary, to reduce the amount of oxygen dissolved in the water to be returned to the well to an absolute minimum in order to prevent oxidation and subsequent deterioration of the oil well casings.

To handle such conditions, various types of separating systems and devices have been designed to float the petroleum and/or solid particles from the water. A simple, commercial system currently available utilizes an open tank into which contaminated liquid is introduced. Pressurized gas or air is dispersed as small bubbles in the liquid carrying petroleum and/or solid particles to the surface whence they are removed. To obtain water of acceptable purity, a minimum retention time in the range of 20-30 minutes is generally required. A disadvantage of such systems is that they cannot quickly react to sudden increases in contaminant loading without loss in efficiency. Further, such systems are not capable of removing oxygen normally present in the liquid.

OBJECTS OF THE INVENTION

It is the primary object of the present invention to provide a device which is capable of separating insolubles from a liquid while at the same time reducing substantially the oxygen content of the liquid.

Another object is to provide a flotation system and process whereby insolubles and oxygen can be removed from a liquid efficiently and at reduced treating times.

Still another object is to provide a flotation system in which an oxygen-free gas is induced and dispersed into the liquid being processed to effect separation of both the insoluble contaminants and dissolved oxygen, whereby the residual liquid may be introduced into a well without causing corrosion of the pipes and other metal parts.

In order that the invention may be more readily understood and carried into effect, reference is made to the accompanying drawings and the following description thereof, which are presented by way of illustration only and are not to be taken as limiting the invention, the scope of which is defined by the appended claims rather than by the specific descriptive matter contained herein.

SUMMARY OF THE INVENTION

Figure 1:
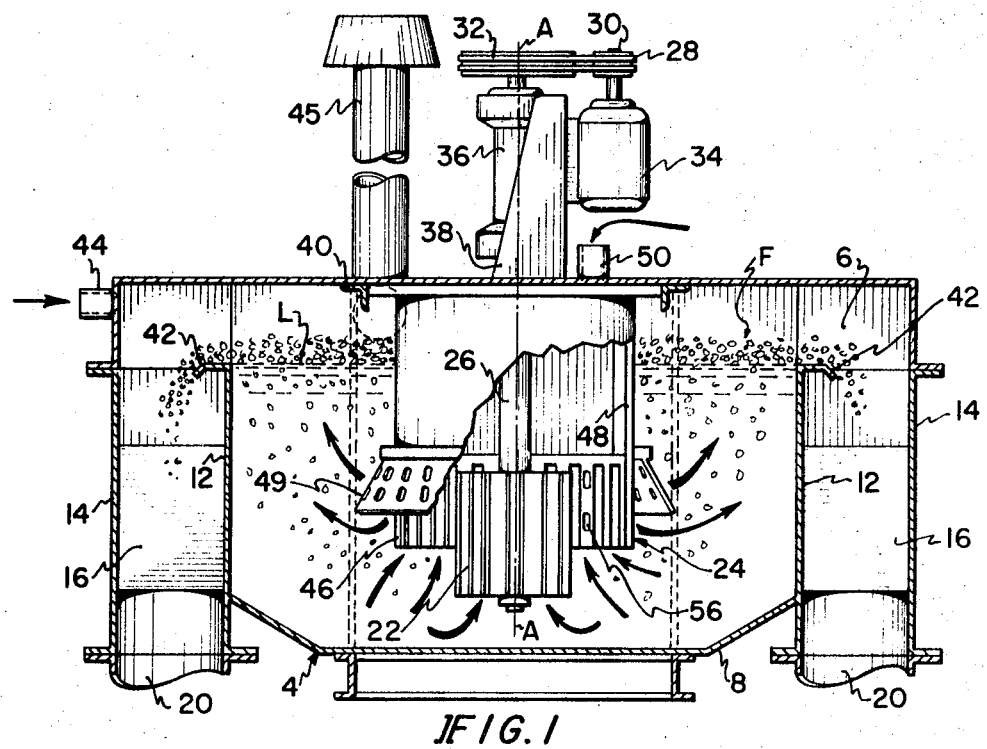
FIG. 1 is a sectional view, taken in the plane of line 1—1 of FIG. 2, of flotation apparatus embodying the invention, certain parts being broken away and others shown in elevation for purposes of clarity.

The foregoing and other objects of this invention are attained by a flotation apparatus which includes an enclosed tank having a feed inlet and a means for maintaining in the tank a predetermined level of liquid and an overlying freeboard space sealed from the atmosphere, means for supplying gas to the freeboard space, means in the tank for drawing gas from the freeboard space downwardly into the liquid and for dispersing the gas within the liquid to effect flotation of insolubles and displacement of contained oxygen, and means for recovering the insolubles floated to the surface of the liquid.

With this apparatus, it is possible to remove insolubles and oxygen simultaneously from a liquid quickly and efficiently.

DESCRIPTION OF PREFERRED EMBODIMENT

The illustrated apparatus includes a plurality of flotation cells, designated generally by numerals 1 and 2, positioned within an enclosed rectangular tank 4 defined by end walls 10, sidewalls 14, cover or top 6 and a bottom 8. An internal discharge launder 16 is formed on each side by a short sidewall 12 spaced inwardly from the sidewall 14 and terminating beneath the cover 6. The launder is provided with a sloping bottom 18 which is provided with an outlet 20 at its lowest point.

As shown in the drawings, particularly in FIG. 1, each cell includes a rotor 22 and a stator 24. The rotor is fixed to a substantially vertical rotatable shaft 26 and is suspended above the tank bottom for rotation about a vertical axis "A." The rotor is driven by means which includes motor 34, belts 28, pulleys 30 and 32, bearing 36 and a support bracket 38. The bracket is supported by beams 40 spanning the tank. A sealed freeboard space "F" is maintained between the cover and the liquid level "L." The upper lipped edge 42 of the inside wall 12 of the trough serves as an overflow weir which maintains the liquid at a predetermined level "L." If desired, the weir may be made adjustable to vary the liquid level. Partition 43 separates the two flotation cells but permits liquid to flow therebetween.

A gas inlet 44 opens into the freeboard space for supplying gas thereto. A continuous adjustable gas bleed and breathing system 45 of conventional design is in communication with the freeboard space to control gas pressure therein.

The stator 24 includes a lower section 46 mounted concentrically about the rotor 22 and extending downwardly to terminate at an elevation between the top and bottom of the rotor. The top portion of the stator is an open-ended cylindrical portion 48 supported from the beams 40 and in communication with the freeboard. With this arrangement gas is induced from the freeboard to the lower part of the stator 46 adjacent the rotor 22 and dispersed therefrom into the liquid as minute bubbles. The stator may include a downwardly, outwardly flaring perforated stabilizing hood 49. A valved inlet 50 is provided for supplying flotation aids as required.

Figure 2:
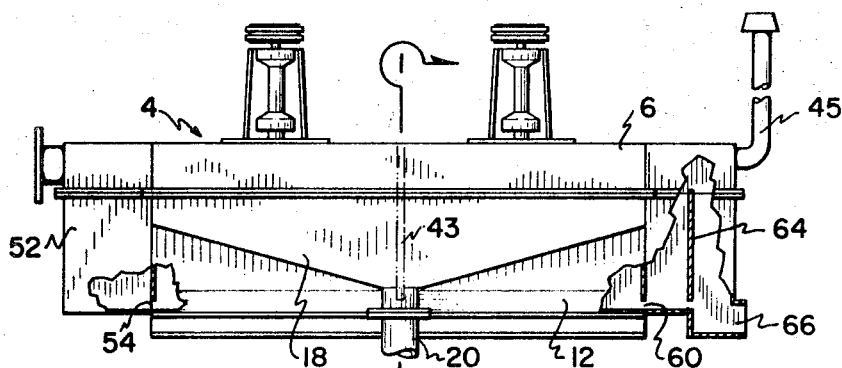
FIG. 2 is a side elevation view of a two-cell flotation apparatus embodying the invention.
Figure 3:
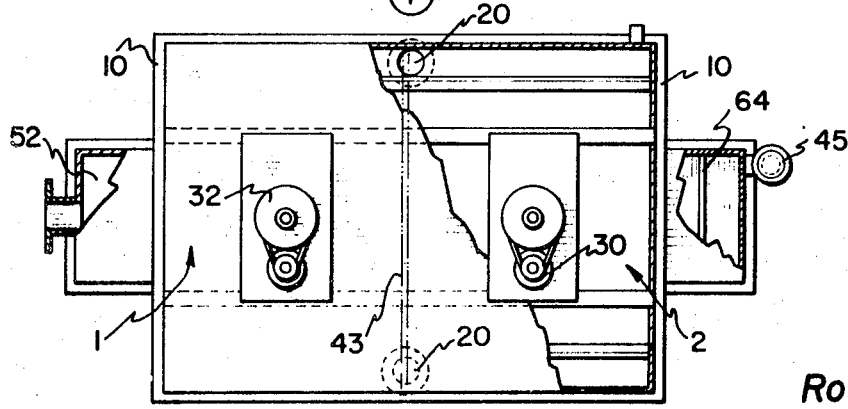
FIG. 3 is a top view of the apparatus shown in FIGS. 1 and 2, the cover being partly broken away for purposes of clarity.

In operation, the feed liquid is introduced into feed box 52 (FIGS. 2 and 3) whence it flows through a port 54 into the lower portion of the first cell, and thence to the second cell through or under partition 43.

In each cell, rotation of the rotor draws liquid into the lower stator structure 46 where it is mixed with gas drawn downwardly from the freeboard. The amount of gas drawn from the freeboard and dispersed into the liquid depends directly on the speed of the rotor. An amount, for example, of about 60 cubic feet per barrel of liquid is normally dispersed into the liquid. However, this amount does not represent that which is supplied from an outside source, as a substantial portion of the dispersed gas is continually reused, that is it is released from the liquid and is collected in the freeboard space from whence it is redispersed into the liquid. The amount of makeup gas added through inlet 44, coupled with the recollected gas, is sufficient to maintain a gas blanket over the liquid at a preselected pressure of between about one-half to 1 ounce.

The substantial centrifugal force generated by the rotor throws the liquid gas mixture outwardly toward and through the ports 56 in the stator wall. As the mixture flows through the ports, larger gas bubbles are dispersed into very small bubbles which adhere to contaminants and carry them to the surface in known fashion. The particle-carrying bubbles (froth) flows over lips 42 into the troughs 16 for eventual discharge through outlets 20. With the above arrangement, large volumes of finely disseminated gas bubbles repeatedly induced into the liquid results in a system which provides a greater probability of bubbles-insolubles contact, thereby increasing flotation efficiency. With this type of arrangement retention times as low as 2 to 5 minutes may be used. This system may be operated either on a continuous or a batch basis.

The clarified water is removed from the tank through outlet 60 under adjustable weir 64 to final outlet 66.

Although the apparatus of this invention is designed mainly for removing solids and oxygen from a liquid, the apparatus can also be used for aerating an oxygen deficient liquid. In this instance, the oxygen-free gas normally employed would be replaced with air and the system operated in the manner heretofore described. Aeration efficiency is increased by operating under a pressure slightly above atmospheric.

I claim:
1. Flotation apparatus comprising:
   a. An enclosed tank having an inlet for introducing a feed liquid therein,
   b. Means for maintaining a predetermined level of liquid in said tank and an overlying freeboard space,
   c. Means for supplying a gas to said freeboard space,
   d. Draft means extending downwardly into said tank and below said liquid level for drawing said gas downwardly from said freeboard space into said liquid and dispersing said gas into said liquid as gas bubbles for floating insoluble contaminants contained in said liquid into said freeboard space.
   e. Means for recovering the insoluble contaminants floated to the surface of said liquid, and
   f. Means for recovering the residual liquid from which the insoluble contaminants have been floated.
2. Flotation apparatus of claim 1 with the addition of pressure responsive control means for maintaining a substantially constant gas pressure in said freeboard space.
3. Flotation apparatus of claim 2 which includes means for maintaining the gas in said freeboard space at a super atmospheric pressure.
4. Flotation apparatus of claim 3 wherein said draft means for drawing and dispersing gas into the liquid comprises a rotor mounted in the tank for rotation about a generally vertical axis with the bottom of said rotor adjacent to and spaced from the bottom of the tank, said rotor comprising a central axial portion, a plurality of generally axially extending vanes supported by and extending generally radially of said axial portion, and generally axially extending portions projecting generally transversely of said vanes at location on said vanes spaced from the axis of said rotor; and stator means supported in said tank with its lower end substantially above the bottoms of said rotor vanes, said stator means being generally vertical and spaced concentrically about said rotor vanes, said stator including a plurality of elongated members spaced apart to enable liquid flow therebetween from the interior of said stator toward the surrounding portion of said enclosed tank.
5. A process for simultaneously separating insoluble materials and oxygen from a contaminated oxygen-bearing liquid comprising the steps of establishing and maintaining in an enclosed tank an ever changing body of contaminated oxygen-bearing liquid with an overlying freeboard space closed to the atmosphere, continuously introducing a substantially oxygen-free gas into said freeboard space drawing said gas from said freeboard space by a draft means extending downwardly into said tank and into said liquid body and dispersing same within said liquid body as bubbles thereby to float contaminants to the surface of the liquid body while concomitantly displacing oxygen from said liquid, discharging floated contaminants and at least some of the displaced oxygen from the freeboard space in said tank and separately discharging the residual liquid from which said contaminants and oxygen have been separated.
6. The process of claim 5 wherein gas in said freeboard is maintained at a pressure above atmospheric.
7. The process of claim 6 wherein gas is continuously bled from said freeboard space to the atmosphere.
8. The process of claim 7 wherein the contaminants comprise a mixture of a water insoluble liquid and particulate matter and said oxygen-free gas is a petroleum gas.

* * * * *